United States Patent [19]
Sabes

[11] 3,987,872
[45] Oct. 26, 1976

[54] LIQUID COOLED, EXTERNALLY ENGAGING DRUM BRAKE

[75] Inventor: Jean Sabes, Anzin, France

[73] Assignee: Societe Anonyme dite: J. Sabes & Cie, Anzin, France

[22] Filed: Apr. 14, 1975

[21] Appl. No.: 567,824

[30] Foreign Application Priority Data
Apr. 16, 1974 France .............................. 74.13240

[52] U.S. Cl. .......................... 188/264 E; 192/113 B
[51] Int. Cl.² .......................................... F16D 65/80
[58] Field of Search ........ 188/264 D, 264 E, 264 R; 192/113 A, 113 B, 113 R

[56] References Cited
UNITED STATES PATENTS

| 1,674,851 | 6/1928 | Boykin, Jr. .................. 188/264 R X |
| 1,906,525 | 5/1933 | Boykin, Jr. ...................... 188/264 D |
| 2,299,208 | 10/1942 | Bloss .............................. 188/264 D |
| 2,412,706 | 12/1946 | Anderson ......................... 188/264 D |
| 2,488,880 | 11/1949 | Piron .............................. 188/264 R |
| 2,851,132 | 9/1958 | James ............................. 188/264 R |
| 3,000,472 | 9/1961 | Sturgis ........................... 188/264 R |
| 3,007,554 | 11/1961 | Eames ............................. 188/264 D |

FOREIGN PATENTS OR APPLICATIONS 498,741  12/1953  Canada .......................... 188/264 D

*Primary Examiner*—George E. A. Halvosa
*Attorney, Agent, or Firm*—Bacon & Thomas

[57] ABSTRACT

A drum brake is provided with a liquid cooling circuit, wherein the rim is provided with a circuit for a cooling liquid, said circuit being on the one hand connected to a source of liquid under pressure and on the other hand opens outwardly on at least one of the faces of the rim. The invention avoids any excessive heating and subsequent deterioration of the brake band.

13 Claims, 10 Drawing Figures

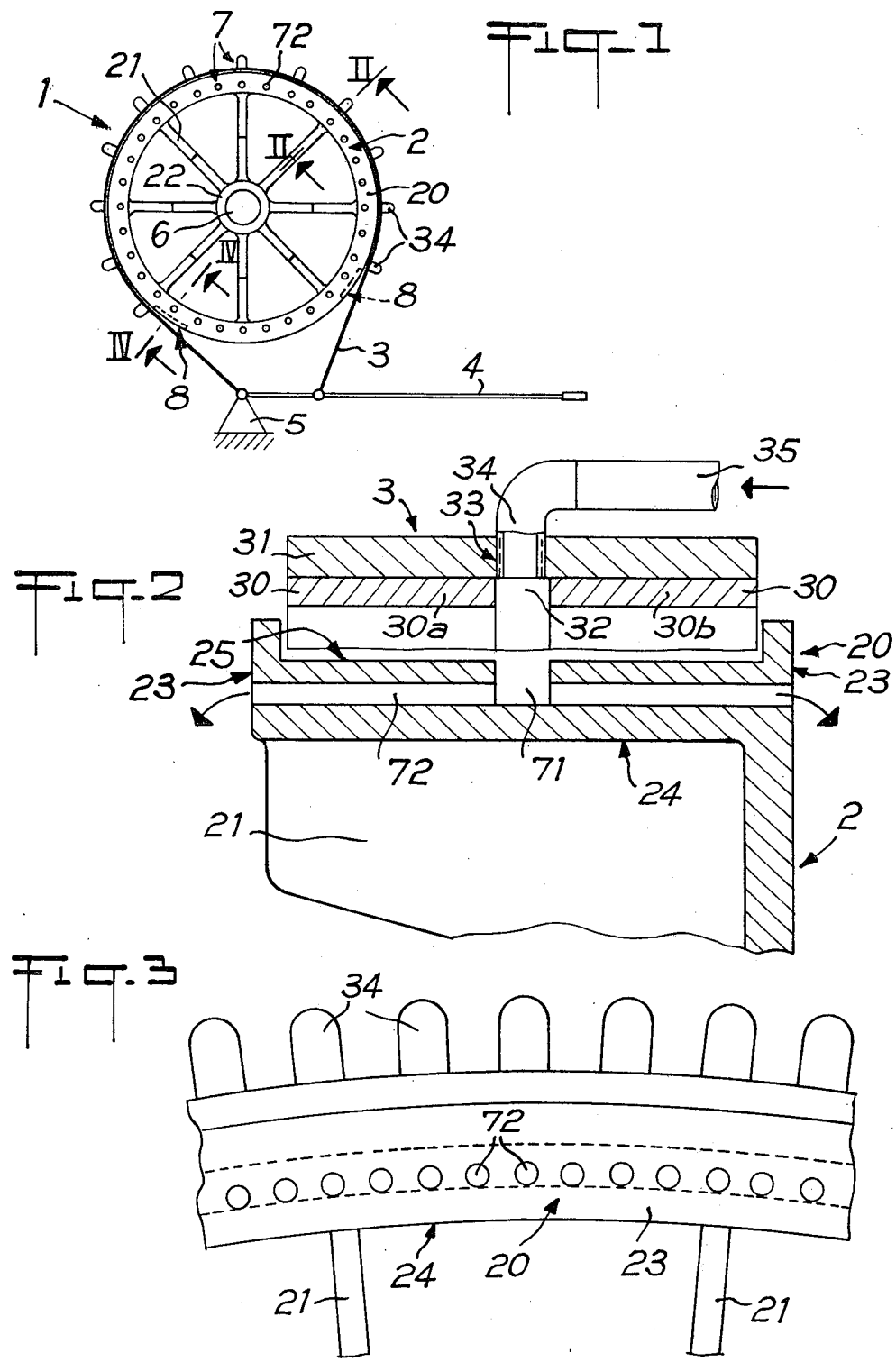

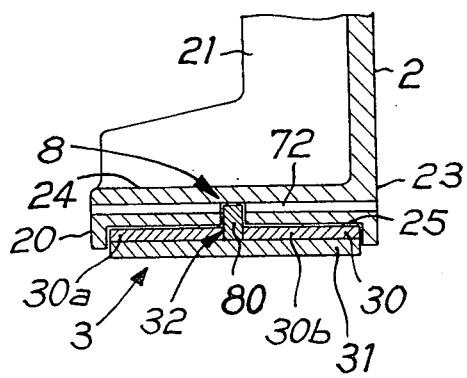
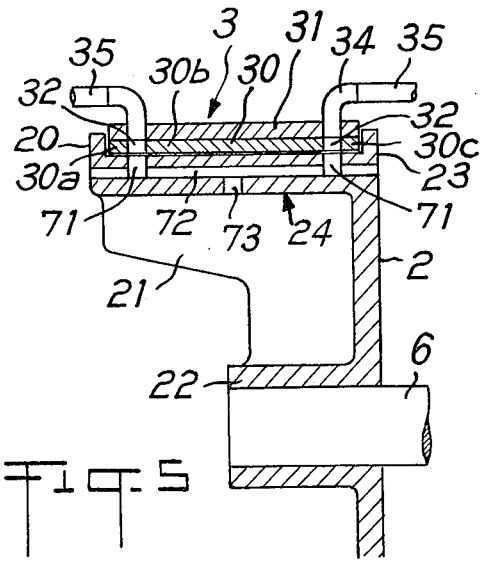
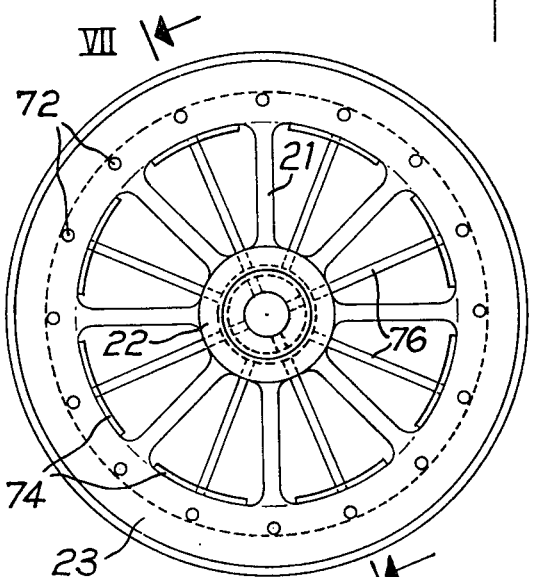
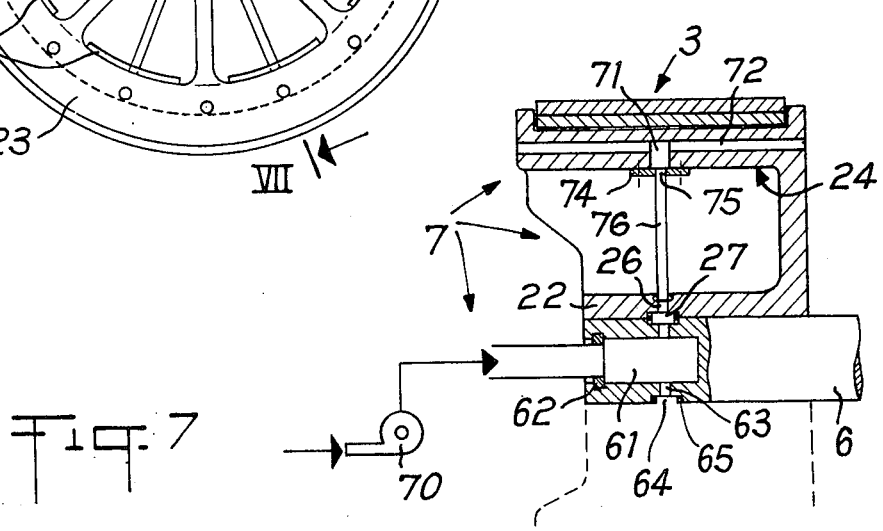

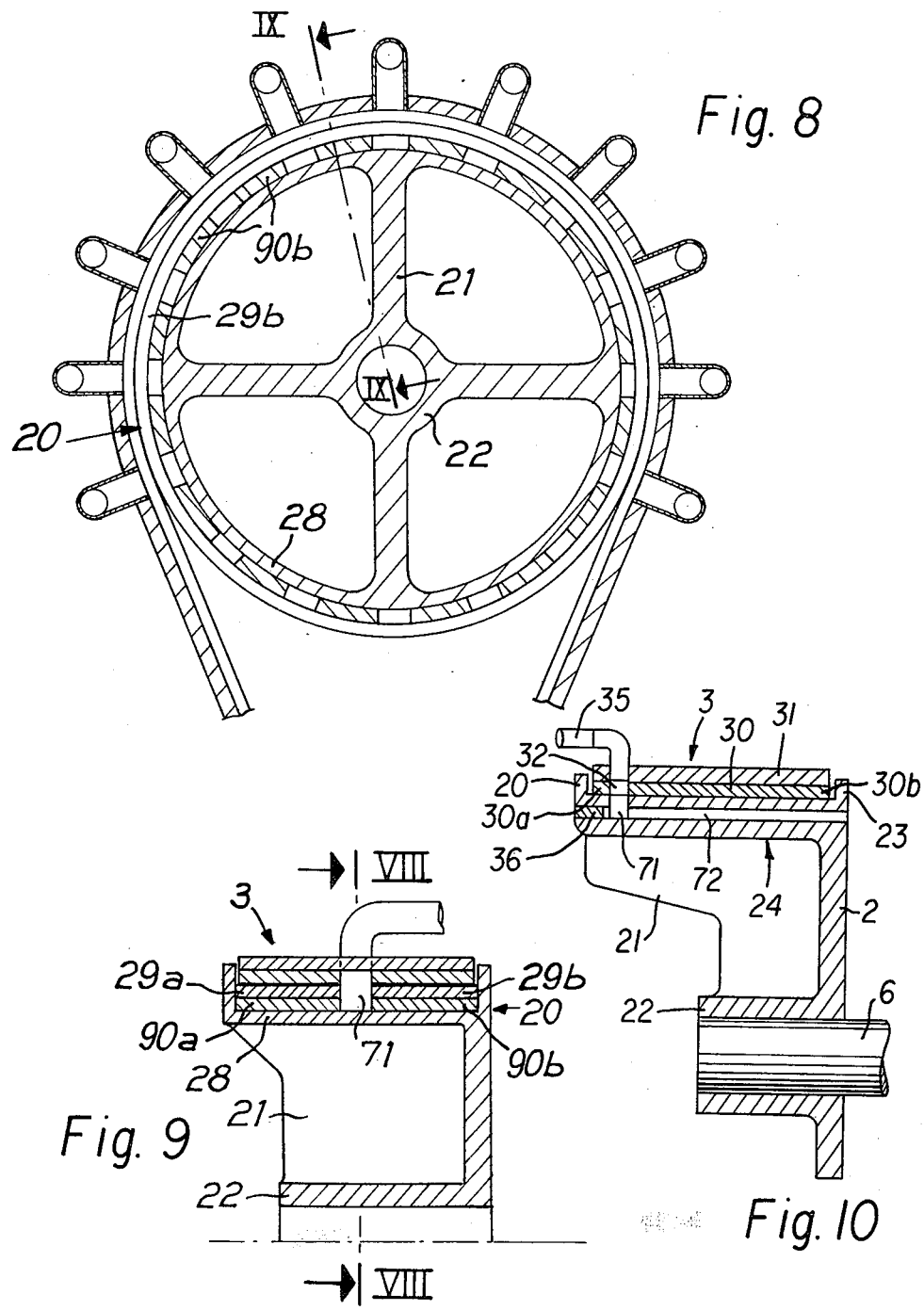

LIQUID COOLED, EXTERNALLY ENGAGING DRUM BRAKE

The present invention relates to a drum brake provided with a cooling device and comprising a brake pulley, composed of a rim, radial spokes and a hub, mounted to rotate on an axis, and fast with a member to be braked, such as a winch, a brake band comprising a steel strip and a friction lining and surrounding the friction surface of the rim of the pulley over an angle of more than 300°, and a control lever articulated on a fixed point as well as at the two ends of the brake band, the rim being provided with a circuit for a cooling liquid, said rim comprising a large number of transverse cooling channels and being connected to a source of liquid under pressure.

The braking force is known to be transformed into heat, this leading to a considerable increase in the temperature of the different elements of which the drum brake is composed, particularly the friction lining fixed to the brake band and the peripheral parts of the brake pulley.

It is known to provide the radial spokes connecting the rim to the hub of the pulley with cooling fins or ribs, but this measure has proved to be entirely ineffective, especially in the case of long, or often repeated periods of braking. In this case, it is the brake lining which heats beyond the admissible temperature and which deteriorates under the effect of the temperature produced by the friction of the lining on the friction surface of the pulley. To remedy this drawback, it has been proposed to provide the rim of the drum brake with a circuit for a cooling liquid.

U.S. Pat. No. 3,007,554 shows a closed circuit connected to a source of liquid under pressure and comprising transverse passages formed between teeth in the peripheral part of the rim. These passages have a small section of passage for the liquid, this therefore limiting the flow of this latter and consequently the flux of heat evacuated. U.S. Pat. No. 2,808,134 also shows a closed circuit for a cooling liquid provided in the rim of a drum brake. This circuit comprises liquid chambers in the peripheral part of the drum, these chambers being connected together by pipes of relatively small section, this therefore notably reducing the efficiency of the circuit.

The present invention proposes to provide a drum brake of the type mentioned hereinabove and in which the cooling device is efficient and simple, adapted in particular for use on ships or like vessels.

This objective is attained in accordance with the invention by the fact that the cooling circuit opens outwardly on at least one of the side faces of the rim, through said cooling channels provided in the rim. In this way, the circuit of the cooling liquid is open, this making it possible to obtain a strong flow of this liquid. In this way, the flow of liquid and consequently the quantity of heat evacuated, is very high.

The rim of the cooling circuit advantageously comprises at least one annular groove as well as a plurality of transverse cooling channels parallel to the axis of the pulley and opening out on the one hand into said groove and on the other hand on at least one outer face of the rim and the groove is connected to a source of liquid under pressure.

The circular watering groove of the cooling circuit is made in the rim from the friction surface in contact with the friction lining.

The circular sprinkling groove may also be made in the rim from the inner face of this latter facing the hub of the brake pulley.

When the or each circular groove is made in the rim from the friction surface of this latter, the friction lining fast with the steel strip of the brake band is subdivided in the axial direction of the pulley into at least two parts which, near the groove of the rim, leave a supply channel which develops in a plane perpendicular to the axis of the pulley and coincides with the median plane of the groove and whose bottom is constituted by the internal face of the steel strip, and this steel strip comprises, in the zone of contact between its friction lining and the brake pulley and at the locality of said channel, a series of tappings opening into said channel and communicating through connections and flexible pipes, with the source of pressurised liquid.

When the or each circular groove is made in the rim from the inner face of said latter facing the hub of said brake pulley, each annular sprinkling groove is covered with a plurality of curved sealing plates which extend between the different radial spokes, are fixed to said internal face of the rim and comprise a series of radial tappings opening into the corresponding groove, the hub comprises in the extension of the tappings a corresponding number of radial piercings connected to said tappings with the aid of conduits and the spindle on which the hub is mounted comprises a blind axial bore which communicates on the one hand with the source of pressurised liquid and on the other hand with the radial piercings through the radial channels made in said spindle and opening out into the blind bore.

In particular in the case of the rim comprising one circular groove only, the transverse cooling channels advantageously open out onto at least one of the two side faces of the rim.

In the case of a single circular groove being disposed in the rim near a lateral face of the brake pulley, the transverse channels open out onto the other side face of said rim.

It is also possible to provide on the rim two circular grooves disposed near the lateral faces and to make each of the transverse channels open out on the internal face of the rim facing the pulley hub, by means of radial openings made in the internal part of the rim and half-way between the two circular grooves.

In this case, the transverse channels may be obturated at their side ends or may open out on the side faces of the rim.

Similarly, the friction lining may be subdivided into three parts so as to leave between two adjacent parts a channel developing in a plane perpendicular to the axis of the pulley and coinciding with a circular groove of the rim, and the steel strip of the brake band comprises in the zone of each channel a series of tappings opening into the corresponding channel and connected, by means of connections screwed into the tappings and of flexible pipes, with the source of fluid under pressure.

In order to avoid unnecessary losses of cooling liquid, and in the case of the or each groove being made in the rim from the friction face, obturation means are provided for each groove, at least in the zone where the lining leaves said surface.

These obturation means are advantageously constituted by a plate fixed, edgewise, to the steel strip, between two parts of lining in the extension of the corresponding channel, and penetrating like a rib into the corresponding circular groove, the contact face of the plate or rib with the bottom of the groove being adapted to the cylindrical form of said latter.

The number and section of the transverse channels are advantageously chosen so that the sum of the sections of these channels is at least equal to one half of the surface area of the friction surface of the brake pulley.

Instead of making the brake pulley in cast iron or cast or injected steel and of making the grooves and transverse channels by milling and boring, the pulley may be made of welded or rivetted pieces.

In this case, the rim of the pulley comprises a so-called internal cylindrical sheet extending over the whole width of the pulley and at least two so-called external cylindrical sheets, surrounding the internal sheet and separated therefrom by a series of spacer listels disposed parallel to the axis of the pulley, the two outer sheets which constitute the friction surface of the pulley, in the same way as the spacer listels associated with each of these two sheets delimiting between their adjacent side ends with a part of the internal sheet a circular groove, whilst two adjacent listels and one of the two external sheets and the internal sheet defining one of the transverse channels open out on the one hand on the side face of the pulley and on the other hand into the circular groove, the different sheets and listels being welded or rivetted together.

Of course, the sum of the axial lengths of the two outer sheets and the width of the circular groove defined thereby is equal to the axial length of the internal sheet of the rim.

It is also possible to provide one outer sheet only, and two internal sheets so that the circular groove is found opposite the hub of the brake pulley.

The invention will be more readily understood on reading the following description with reference to the accompanying drawings, in which:

FIG. 1 is a schematic side view of one of the types of drum brakes according to the invention;

FIG. 2 is a radial section of the brake pulley and the brake band along the line II—II of FIG. 1, the brake band being separated from the pulley for greater clarity;

FIG. 3 is a lateral view in detail of the pulley according to FIG. 2;

FIG. 4 is a radial section through the brake pulley and the brake band in the zone where this latter leaves said pulley, in the direction of line IV—IV of FIG. 1;

FIG. 5 shows a radial section through a second embodiment of the drum brake;

FIG. 6 shows a side view of a third embodiment of the invention;

FIG. 7 is a radial section along the broken line VII—VII of FIG. 6;

FIG. 8 is a section perpendicular to the axis of the pulley along line VIII—VIII of FIG. 9, FIG. 9 is a radial section along the line IX—IX of FIG. 8; and FIG. 10 is a view similar to FIG. 5 but showing a further modification.

Referring now to the drawings, FIGS. 1 to 9 show a drum brake 1 which comprises a brake pulley 2 fast with a member to be braked, such as a winch (not shown), a brake band 3 surrounding a large part of the friction surface of the pulley 2 over an angle of more than 300°, and a control lever 4 articulated on a fixed point 5 and at the two ends of the band 3, the free end of the lever 4 being either actuated manually or associated with actuating means (not shown) such as hydraulic jacks, etc.

The brake pulley 2 is composed of a rim 20, radial spokes 21 and a hub 22, the spokes 21 being fast with the hub 22 and the rim 20. The hub 22 is for example mounted to rotate on an axis 6 housed in supports (not shown).

The brake band 3 is composed of a friction lining 30 and a steel strip 31 on which said lining 30 is suitably fixed.

The rim 20 of the brake pulley 2 is provided with a cooling circuit 7 connected to a source of liquid under pressure, such as a delivery pump 70 and opening onto at least one of the faces 23, 24 of the rim 20 other than the one constituting the friction surface 25. The cooling circuit comprises in the rim 20 at least one annular or circular groove 71 constituting a sprinkling ramp, as well as a plurality of so-called transverse cooling channels 72, which are made in the rim 20 parallel to the axis of the hub 22 and open onto at least one of the faces 23, 24 of the rim 20. In the case of the embodiments shown, these cooling channels 72 open onto the two side faces 23 of the rim. However, in certain cases, these channels 72 may also open out onto the internal face 24 of the rim 20 through a series of radial openings 73 as shown in FIG. 5. The channels 72 may also open out onto only one of the two side faces 23 or only on the internal face 24 of the rim 20.

The or each circular groove 71 is made in the rim 20 either from the friction face 25 (FIGS. 2 to 5), or from the internal face 24 of the rim 20 facing the hub 22 (FIGS. 6, 7). The depth of the annular groove 71 is such that at least all the transverse section of the channels 72 is included in the side faces of this groove. When only one groove 71 is provided, it is preferably disposed half-way between the two side faces 23 of the rim 20 (FIGS. 2, 4, 7 and 9) or near one of said side faces 23. On the contrary, if two grooves 71 are provided, it is advantageous to dispose them near the side faces 23 and at equal distance from the series of radial openings 73 located in the median plane of the pulley 2, plane perpendicular to the axis of the pulley (FIG. 5).

When the circular groove 71 is made in the rim 20 from its friction surface 25 (FIGS. 2 to 5 and 8, 9), the friction lining 30 is composed of at least two parts 30a, 30b which are juxtaposed and spaced from each other in the axial sense of the pulley 2, opposite the groove 71 of the rim 20, so as to leave therebetween a feed channel 32 whose bottom is constituted by the steel strip 31, and which develops on either side of a plane coinciding with the median plane of the groove 71. The width of the channel 32 is substantially equal to that of the groove 71. In the zone of contact between the brake band 3 and the pulley 2, the steel strip 31 comprises, opposite the channel 32, a series of tappings 33 in which are screwed bent connections 34 connected by means of flexible pipes 35 to a distributor or to the source of pressurised fluid 70.

When there are several grooves 71 (FIG. 5), as many channels 32 and series of tappings 33, connections 34 and pipes 35 are provided. The lining 30 is then subdivided into a number of corresponding parts (three pieces 30a, 30b, 30c according to FIG. 5).

Instead of ensuring the supply of cooling liquid through the brake band 3, and when the groove 71 is made in rim 20 from its internal face 24, the feed of the cooling circuit 7 may be effected in accordance with the embodiment shown in FIGS. 6. and 7. In this case, the groove 71 is covered, on the side facing the hub 22 and between two adjacent radial spokes 21, by curved sections of sealing plate 74 suitably fixed to the internal face 24 of the rim 20 and provided with a series of radial tappings 75 opening into the corresponding groove 71. In this case, the hub 22 comprises, preferably in the extension of the tappings 75, a corresponding number of radial piercings 26 connected to said tappings 75 by means of conduits 76. The spindle 6 on which the hub 22 is mounted presents a blind axial bore 61 which is connected, on the one hand, by means of a rotary joint 62 to the source of pressurised liquid 70 and, on the other hand, to the bottom of the bore 61 and with the aid of radial piercings 63 and a distributing annular channel 64 to the different radial piercings 26 of the hub 22 which, opposite the channel 64, may comprise a collector channel 27. Of course, annular seals 63 are provided on the side of the channels 27, 64.

To avoid a considerable leakage of the cooling liquid in the zone of the friction face 25, said zone not covered by the brake band 3, the control lever 4 may be so disposed as to be located above the pulley 2. However, this solution is advantageous only if work is effected with a liquid under very low pressure.

To the same end, the dispositions as shown in the drawing may be conserved and means 8 for obturating the groove 71 and the channel 32 may be provided, in the zone where the lining 30 leaves the friction surface 25 of the pulley 2.

These obturation means 8 are, according to a preferred embodiment, constituted by an obturation plate 80 disposed edgewise on the steel strip 31 between the lining parts 30a, 30b defining the supply channel 32 so as to close said channel 32 in the zone where the brake band leaves the rim 20 tangentially to the friction surface 25. This obturation plate 80 projects from the internal surface of the lining 30 and penetrates, in the manner of a rib, with a small lateral clearance, into the corresponding annular groove 71 of the rim. The contact face of the obturation plate or rib 80 with the bottom of the groove 71 is cylindrical and takes the cylindrical form of the bottom of the groove when the brake is operated. It is obvious that the obturation plate 80 is made of a material which is at least just as resistant as the material of which the friction lining 30 is composed.

The number of cooling channels 72 and their transverse section offer the liquid a section of passage which is advantageously equal to at least the half of the surface area of the friction surface 25.

When the braking pulley 2 is made from welded or rivetted pieces, as in the case of the embodiment shown in FIGS. 8 and 9, the rim 20 comprises an internal cylindrical sheet 28 welded to its inner face 24 on the radial spokes 21 fast with the hub 22, and two external cylindrical sheets 29a, 29b of the same diameter disposed coaxially with respect to said internal sheet 28 and surrounding said latter at a certain radial distance which is determined by a series of spacer listels 90a and 90b extending parallel to the axis of the pulley 2.

As shown in FIG. 9, the sum of the widths of the two external sheets 29a, 29b is smaller than that of the internal sheet 28, by a value corresponding to the width of the annular groove 71. The length of the spacer listels 90a, 90b is equal to the width of each of the external sheets 29a, 29b which are preferably also of equal width.

In the median part of the rim 20, the adjacent ends, on the one hand of the external sheets 29a, 29b and on the other hand of the listels 90a, 90b, define, with the internal sheet 28, the annular groove 71. The free lateral faces 91, 92 of the listels 90a, 90b delimit with the corresponding external sheet 29a or 29b and the internal sheet 28 the cooling channels 72 which, in the case shown, open out onto the side faces of the rim 20.

FIG. 10 illustrates a further embodiment similar to that of FIG. 5 but wherein only a single annular groove 32 is provided in the friction lining, adjacent one axial edge of the brake band and in line with only a single annular groove 71 in the rim of the brake drum. In this form, a closure element 36 is provided in the passageway 72 so that the latter opens through a side edge of the rim opposite the edge adjacent which the annular groove 71 is positioned.

It is obvious that two internal sheets and one external sheet may be used if it is desired to make a rim whose annular groove is fed from the internal face 24 of the rim, as is shown in FIG. 7.

The embodiments described above may undergo a certain number of modifications without departing from the scope of the invention which is defined by the accompanying claims. It is therefore not at all necessary to provide a supply channel in the friction lining, on condition that the tappings provided in the steel strip opposite the sprinkling groove also pass through said lining and thus open out directly into said groove.

What is claimed is:

1. A drum brake provided with a cooling means and comprising a brake pulley comprising a rim having an outer friction surface, radial spokes and a hub, said brake pulley being mounted to rotate on an axis and being fast with a spindle connected to a member to be braked, such as a winch; a brake band having two ends and a friction lining surrounding the friction surface of the rim over an angle of more than 300°; a control lever articulated on a fixed point as well as at the two ends of the brake band; and a circuit for a cooling liquid connected to a source of pressurized liquid, said circuit comprising a multiplicity of transverse cooling channels extending axially through said rim and which open outwardly at at least one of the side faces of said rim, said circuit including a series of liquid conducting conduits extending radially inwardly from said rim's outer friction surface and communicating with said channels.

2. A drum brake as defined in claim 1, wherein said circuit comprises an annular groove extending around said rim, and communicating with said transverse cooling channels said groove acting as a watering ramp and being connected to said source of pressurized liquid.

3. A drum brake as defined in claim 2, wherein the brake band comprises a steel strip and said friction lining comprises, in the zone of the annular groove, a series of tappings passing through the steel strip and the lining, opening directly into said groove and connected, through connections and flexible pipes, with the source of pressurized liquid.

4. A drum brake as defined in claim 2, wherein the brake band comprises a steel strip fast with the friction lining, said lining being subdivided in the axial direction of the pulley into at least two parts which, near the annual groove of the rim, leave a supply channel which lies in a plane perpendicular to the axis of the pulley and coincides with the median plane of the annular groove and whose bottom is constituted by the internal face of the steel band, and the steel strip comprises, in the zone of contact between its friction lining and the brake pulley and at the locality of said supply channel, a series of tappings opening into said channel and communicating through connections and flexible pipes, with a source of liquid under pressure.

5. A drum brake as defined in claim 2, wherein only one circular groove is disposed in the rim near a side face of the brake pulley and the transverse channels open through the other side face of said rim.

6. A drum brake as defined in claim 2, wherein the rim is provided with two annular grooves disposed near the side faces and each of the transverse cooling channels opens out on the internal face of the rim facing the pulley hub, by means of radial openings made in the internal part of the rim and half-way between the two annular grooves.

7. A drum brake as defined in claim 6, wherein the lateral ends of the cooling channels are obturated.

8. A drum brake as defined in claim 2, wherein the friction lining of the brake band is subdivided into three parts so as to leave between two adjacent parts a supply channel each lying in a plane perpendicular to the axis of the pulley and coinciding with an annular groove of the rim, and the brake band comprises in the zone of each channel a series of tappings opening into the corresponding channel and connected, by means of connections screwed into the tappings and of flexible pipes, to the source of pressurized liquid.

9. A drum brake as defined in claim 2, wherein, for each annular groove, there is provided an obturating means at least in the zone where the friction lining of the brake band leaves the friction surface.

10. A drum brake as defined in claim 9, wherein the obturation means is constituted by a plate fixed edgewise to a steel strip between two parts of lining in the extension of the corresponding supply channel, and penetrating like a rib into said annual groove, the contact face of the plate with the bottom of the groove conforming to the cylindrical form of said latter.

11. A drum brake as defined in claim 1, wherein the number and sectional shape of the transverse channels are so chosen that the sum of the sectional areas of these channels is at least equal to one half of the surface area of the friction surface of the brake pulley.

12. A drum brake as defined in claim 1 and in which the pulley is constituted by separate pieces secured together, wherein the rim of the pulley comprises a so-called internal cylindrical sheet extending over the whole width of the pulley and at least two so-called external cylindrical sheets surrounding the internal sheet and separated therefrom by a series of spacer listels disposed parallel to the axis of the pulley, and the two external sheets constituting the friction surface of the pulley, in the same way as the spacer listels associated with each of these two sheets provide between their adjacent ends and with a part of the internal sheet a circular sprinkling groove, whilst two adjacent listels and one of the two external sheets and the internal sheet define one of the transverse cooling channels opening out on the one hand on the lateral face of the pulley and on the other hand into the circular groove.

13. A drum brake provided with a cooling means and comprising a brake pulley comprising a rim having an outer friction surface, radial spokes and a hub, said brake pulley being mounted to rotate on an axis and being fast with a spindle connected to a member to be braked, such as a winch; a brake band having two ends and a friction lining surrounding the friction surface of the rim over an angle of more than 300°, a control lever articulated on a fixed point as well as at the two ends of the brake band; and a circuit for a cooling liquid connected to a source of pressurized liquid, said circuit comprising a multiplicity of transverse cooling channels extending axially through said rim and which open outwardly at at least one of the side faces of said rim, said circuit including a series of liquid conducting conduits communicating with said channels, and comprising an annular groove extending around said rim, and communicating with said transverse cooling channels, said groove acting as a watering ramp and being connected to said source of pressurized liquid, said annular groove being formed in the rim at the internal face thereof and facing the hub of the brake pulley, and said annular groove also being covered with a plurality of curved sealing plates which extend between the different radial spokes, are fixed to the internal face of the rim and comprise a series of radial tappings opening into said annular groove, the hub comprises in the extension of the tappings, a corresponding number of radial piercings connected to said tappings by conduits, the spindle on which the hub is mounted having a blind axial bore which communicates on the one hand with the source of pressurized liquid, and on the other hand with the radial piercings through the radial channels made in said spindle and opening into the blind bore.

* * * * *